Patented Feb. 22, 1938

2,108,806

UNITED STATES PATENT OFFICE 2,108,806

CELLULOSE MATERIALS AND METHOD OF TREATING SAME

Theron G. Finzel and Donald E. Drew, Kenmore, N. Y., assignors, by mesne assignments, to E. I. du Pont de Nemours & Company, Wilmington, Del., a corporation of Delaware No Drawing. Application June 26, 1934, Serial No. 732,440

9 Claims. (Cl. 91—68)

This invention relates to preparing materials which are to be subsequently impregnated with appropriate compositions for transparentizing with or without simultaneously moistureproofing. More particularly, this invention relates to the treatment of cellulose bases in order to increase the absorptive capacity thereof so that, when it is transparentized by impregnation with a suitable transparentizing medium, a highly transparent material is secured.

In the manufacture of waxed, varnished or lacquered paper, the usual procedure is to pass the web through a tank of a selected liquid composition or to transfer the same to the paper surfaces by suitable rolls, felts and the like. The thus treated web, with or without the removal of the excess composition, is subjected to a treatment whereby the solid ingredients of the liquid are fixed. In the case of waxed paper, the fixation is secured by cooling. In the case of varnishes and lacquers, the fixation is effected by evaporation of the solvents. From an economic standpoint, it is very advantageous that the speed of these processes, in feet per minute, be as great as possible. In the interest of uniformity of product, the speed must be sufficiently slow to permit impregnation of the web.

The paper used in the procedures previously mentioned may vary from a medium weight, porous bread wrap to a thin, dense, highly calendered glassine paper, or, indeed, heavier papers. All of these papers, whether porous, dense or non-porous, are, in part, composed of myriads of air-filled channels between the fibers and pores, lumens, etc. within the fibers. The opacity of paper in the absence of pigmenting materials, such as clay, is due to a composite of irregular surfaces and optical discontinuities, and cellulose-air interfaces within the web. Uniformity and glass-clear transparency in the product can only be obtained when optically plane or optically smooth surfaces are provided and also when substantially all the air-filled channels, pores, etc. are filled with a transparent substance whose refractive index is about that of cellulose.

It is known that porous papers coated with such materials as varnish and cellulose lacquers, while appearing to be thoroughly impregnated before the evaporation of the solvents, are, when the solvents have been removed, very hazy and full of white opaque spots. This is due not to incomplete impregnation, but to the fact that during evaporation of the solvents the remaining material shrinks in volume and, unless restrained, assumes a volume having the least surface. The only restraining force is the adhesion between the cellulose surfaces and the coating liquid. This adhesion, however, is not sufficient to prevent "pulling away" of the impregnating substance, during fixation, from the fibers. Consequently, the final product exhibits the effect of incomplete impregnation.

In many cases, moderately viscous lacquers will impregnate even a thin porous base so slowly that commercial operative procedures cannot be obtained on ordinary equipment. Hence, such procedures are not commercially practical.

We have found that the above-mentioned defects can be overcome by incorporating in the selected paper to be transparentized a wetting agent, more fully described hereafter, whereby the paper is rendered more absorptive and the pulling away of the coating or impregnating composition from the cellulose surfaces is substantially inhibited, as well as also permitting the use of moderately viscous compositions at increased speeds.

It is therefore an object of this invention to provide paper suitable for transparentizing and containing a wetting agent, whereby the "pulling away" effect of the solids during the evaporation of the solvents is inhibited and the speed of impregnation with moderately viscous compositions may be increased.

Other objects will become apparent from the following description and appended claims.

In accordance with the principles of the instant invention, a wetting agent is incorporated into paper and the paper subsequently impregnated with the selected transparentizing medium.

In the preferred embodiment of the invention, after the incorporation of the wetting agent, the paper base, particularly when the paper is of the porous type, is calendered, preferably supercalendered, in a dampened condition prior to the impregnation with the transparentizing composition.

As illustrative examples of wetting agents may be mentioned soaps, preferably water-soluble soaps, such as triethanolamine oleate, sodium stearate, olive oil soaps, ammonium stearate, ammonium oleate, and sulphonic acid derivatives of the fatty acids, with or without free acid. The foregoing wetting agents may be used alone or in conjunction with each other and/or in conjunction with other substances, such as triethanolamine, stearic acid, naphthalene sulphonic acid, animal, vegetable and mineral oils, and sulphonated animal, vegetable and mineral oils.

The wetting agents may be incorporated in the papers in any suitable manner. In order to thoroughly cover the cellulose surfaces with small amounts of the wetting agent, the paper is preferably impregnated with a dilute solution or dispersion containing the wetting agent. Water is the preferred liquid vehicle not only because it is more economical, but because it exerts a swelling effect on the fibers and more thoroughly carries the wetting agent into the fine capillaries of the paper. Instead of using water alone, water may be used in conjunction with another solvent, such as alcohol, acetone, etc. Non-aqueous solvents, such as chloroform, carbon tetrachloride, benzene, toluene, naphtha solvent, gasoline, ethyl acetate, butyl acetate or solvent mixtures or emulsions thereof, depending upon the solubility of the wetting agents used, and other factors entering the previous and subsequent treatments of the paper, may be used.

When the wetting agent is incorporated in the paper from a non-aqueous solvent, such as toluene, it is advantageous to dampen the paper to about 20%-30% moisture content and subsequently evaporate the moisture. In this way the absorptive capacity of the paper may be increased even though the wetting agent is insoluble in water.

The invention contemplates incorporating in the paper base a small quantity of the wetting agent, for example, from 0.1% to 10% of the weight of the fiber substance of the paper. While larger quantities may be used in some instances without harmful effects, the minimum amount consistent with the best paper impregnation results is desired for the following reasons:

1. Many "wetting-out agents" are unstable (easily oxidize, etc.) or are detrimental to the paper base.
2. The "agents" may cause objectionable odor, color, etc., in large amounts.
3. The "agent" may dissolve into the coating substance, and in appreciable amounts may impart undesirable properties to the product.
4. The "agents" are generally of low refractive index and thus detrimental to the best transparency.
5. The "agents" are generally water-sensitive and, therefore, harmful to the best waterproofness.
6. In appreciable amounts, the "agent" may be detrimental to processing operations, such as calendering, slitting, etc.

The wetting agents may be applied at any time prior to the impregnating and/or transparentizing treatments. It may be applied at any point in the paper manufacture. For instance, it may be applied in the beater, on the wire, in the drier, or in the calendering stacks. Alternatively, it may be applied to a finished paper prior, of course to the impregnation treatment.

The paper which may be used in accordance with the principles of the instant invention may vary from a light or medium weight, porous bread wrap to a thin, dense, highly calendered, glassine paper.

The paper treated with the solution containing the wetting agent is dried in any suitable manner until the moisture content thereof is reduced to from 10% to 20%, based on the bone-dry paper. The dampened paper is super-calendered with rolls sufficiently hot to bring the moisture content down to the air-dry condition. The thus treated paper is then impregnated with the desired transparentizing composition. If desired, in addition to the wetting agent, the paper may also have sizes, cellulose softeners, such as glycerol, dextrin and the like incorporated therein. These materials may be incorporated in the paper before, simultaneously with, or after the incorporation of the wetting agent.

The transparentizing composition may be of the non-waterproofing, waterproofing or moistureproofing type, for example, varnishes, cellulose lacquers, wax containing lacquers and varnishes, cellulose lacquers containing waxes, molten wax compositions, etc. After application of the selected transparentizing composition, the impregnated or coated paper is subjected to a treatment which sets the solids of the composition. In the case of wax compositions, the setting may be effected by chilling. In the case of compositions containing volatile solvents, the setting is effected by evaporation of the solvent.

In order to more clearly indicate the nature of the invention, the following specific examples are given:

*Example I*

A thin porous sulphite tissue (unsized) between .0005" and .001" in thickness is immersed in a solution containing:

| | Percent by weight |
|---|---|
| Ammonium oleate | 1.0 |
| Water | 99.0 |
| | 100.0 |

The paper is drawn out of the solution and the excess liquid is removed by squeeze rolls and then passed over drier rolls until the moisture content has reached 10% to 20%. The dampened paper is super-calendered with rolls sufficiently hot to bring the moisture content down to air-dry condition. The calendered paper, containing about 1.5% ammonium oleate, has greatly superior absorptiveness than a paper similarly treated, but omitting the ammonium oleate, as is evidenced by the following impregnating examples:

(a) The treated paper is impregnated with the following non-aqueous coating material:

| Solids | Percent by weight |
|---|---|
| ½ second nitrocotton | 33.8 |
| *Alkyd resin (oil modified) | 31.2 |
| Rosin | 25.0 |
| Triphenyl phosphate | 10.0 |
| | 100.0 |

*—Consists of 60% glycerol phthalate and 40% castor oil.

| Solvents | Percent by weight |
|---|---|
| Ethyl acetate | 83.0 |
| Toluene | 4.9 |
| Monobutyl ether of ethylene glycol | 10.5 |
| Denatured alcohol | 1.6 |
| | 100.0 |
| Solids | 15.0% |

The paper is immersed in the coating lacquer at 40° C.–50° C. for 10 seconds. It is then withdrawn from the solution and the excess lacquer allowed to drain off for about 10 seconds, or the excess is scraped off with suitable doctor knives. The lacquer solvents are evaporated at 60° C.–90° C. The resulting sheet will be clear, transparent and free from white spots or haze, while an identical sheet, except that it contains no ammonium oleate, will be decidedly spotty, almost to the point of opaqueness.

(b) Instead of the lacquer used in (a), the following transparentizing and moistureproofing compositions may be used with the same conditions and results:

| Solids | Percent by weight |
|---|---|
| Ester gum | 42.5 |
| Low viscosity ethyl cellulose | 34.0 |
| Dibutyl phthalate | 6.4 |
| Paraffin | 4.3 |
| Diethylene glycol | 12.8 |
| | 100.0 |

| Solvents | Percent |
|---|---|
| High flash naphtha | 79.2 |
| Denatured alcohol | 20.8 |
| | 100.0 |

Solids _____ 18%–22%

(c) The same ammonium oleate containing tissue in (a) is calendered and then treated with a synthetic resin varnish of the following composition:

| | Percent by weight |
|---|---|
| *Perilla oil modifed alkyd resin | 40 |
| Toluene | 60 |
| | 100 |

*—Consists of 65% glycerol phthalate and 35% perilla oil.

A small quantity of drier, such as 2% by weight of cobalt linoleate, is preferably also incorporated in the composition.

The paper is immersed in the varnish at 20° C.–60° C. for 10 to 20 seconds, then removed and the excess varnish scraped off, such as with suitable doctor knives. The impregnated film is dried at 30° C.–90° C. The varnished film will appear transparent and free from white haze when viewed over a black background. A similarly treated paper, but containing no "wetting-out agent", will be lacking in transparency and, in addition, will give a dull grayish cast when viewed over deeply colored backgrounds.

(d) The same treated paper as in (a) is immersed for about 5 seconds in molten paraffin wax of about 50° C. melting point. The excess is removed by suitable squeeze rolls, scraper bars, etc., and the paraffin coat solidified by cooling. Instead of immersing the paper in the melt, it may be transferred to the paper by rolls, felts, brushes and the like. In either case, the wax is kept molten while in contact with the paper for about 5 seconds. The product, while being hazy because of wax crystals, is nevertheless uniformly hazy. On the other hand, had the paper not contained ammonium oleate, in addition to being hazy, it would have had many densely white spots as a result of incomplete impregnation. A comparison of the relative degrees of impregnation can best be observed by the blotchy appearance of the paper over a dark background while the wax is still molten.

(e) The same treated paper in (a) is impregnated with a melt of the following composition:

| | Percent by weight |
|---|---|
| 60% melting point paraffin | 92.5 |
| Pure crepe rubber | 7.5 |
| | 100.0 |

The paper is immersed in the molten impregnant at 80° C.–90° C. and the excess removed. The impregnated film is then cooled to 20° C.–30° C. The time during which the paper is kept in contact with the molten composition is about 30 seconds. The final product will appear free from spots or blotches of unimpregnated fibers. A similarly treated paper in which the ammonium oleate is omitted even when the composition is in contact with the paper in a molten condition for 90 seconds, is not as thoroughly impregnated as the ammonium oleate containing paper is in 30 seconds.

(f) The same treated paper as in (a) is impregnated with a molten composition consisting of:

| | Percent by weight |
|---|---|
| Candelilla wax | 40.0 |
| Soft ester gum | 40.0 |
| Carnauba wax | 20.0 |
| | 100.0 |

The paper is immersed in the molten wax composition at about 90° C. sufficiently long to thoroughly impregnate the paper (about 15 seconds). It is then withdrawn, the excess removed, and the composition solidified by cooling. The product is a transparent, clear, and haze-free sheet. Had the ammonium oleate been omitted, a treatment of the paper at least twice as long would have been required to produce a film equally as well impregnated.

*Example II*

The same base tissue in Example I is treated with a solution consisting of:

| | Percent by weight |
|---|---|
| Ammonium oleate | 1.9 |
| Water | 20.7 |
| Denatured alcohol | 77.4 |
| | 100.0 |

The tissue is passed through the "wetting-out agent" solution and the excess solution removed by squeeze rolls, scraper rods, etc. The paper is dried by suitable means to a moisture content of 10% to 15%. It is then calendered with hot rolls during which the moisture content is decreased to normal air-dry content. Instead of drying the paper initially to a predetermined moisture content, such as 10% to 15%, it may be thoroughly dried and later dampened by suitable means to a moisture content consistent with best calendering results. The product obtained after calendering is identical in its absorptive capacity, etc. to that obtained in Example I.

*Example III*

A moderately sized sulphite tissue of .0012" to .0014" in thickness is treated with the following solution:

| | Percent by weight |
|---|---|
| Ammonium oleate | 1.8 |
| Diethylene glycol | 7.0 |
| Water | 19.2 |
| Denatured alcohol | 72.0 |
| | 100.0 |

The paper is wetted, squeezed, dried and calendered as in Example I.

(a) The calendered tissue is impregnated as in Example I (a). The product is essentially free from haze and spots while a similarly treated paper without, however, the ammonium oleate is nearly opaque because of spots produced by "pulling away" of the lacquer during removal of solvents. The diethylene glycol in the paper serves to give it greater flexibility.

(b) The calendered ammonium oleate-diethylene glycol containing tissue is treated with a molten composition as in Example I (f). The tissue is thoroughly impregnated in less than one-half the time required for a similar paper in which the ammonium oleate has been omitted.

*Example IV*

A porous rag-stock paper about .002" in thickness is treated with the following solution according to the procedure in Example I:

|  | Per cent by weight |
|---|---|
| Triethanolamine | 0.25 |
| Triethanolamine oleate | 0.75 |
| Water | 99.0 |
|  | 100.0 |

The calendered product is treated with the varnish according to Example I (c). The product, while not being of very great transparency, is exceptionally free from haze, or white spots, as compared to a similarly treated paper containing no "wetting-out agent" which is white and opaque.

*Example V*

An unsized sulphite paper between .0013" and .0015" in thickness is treated with the following solution:

|  | Per cent by weight |
|---|---|
| Ammonium oleate | 6.5 |
| Water | 20.7 |
| Denatured alcohol | 72.8 |
|  | 100.0 |

The paper is immersed in the solution, withdrawn and the excess removed. It is dried on suitable drying rolls to substantially an air-dry condition. The paper is then calendered. The calendered web is impregnated as in Example I (b). The coated sheet should consist of about two-thirds paper and one-third lacquer solids. It is transparent and free from haze and spots. Had the ammonium oleate not been present in the sheet, it would have been spotty almost to opaqueness.

*Example VI*

A bread-wrap type of paper between .0015" and .003" in thickness is treated with a solution consisting of:

|  | Per cent by weight |
|---|---|
| Sodium stearate | 1.5 |
| Water | 98.5 |
|  | 100.0 | by immersing the paper in the solution, wiping off the excess and drying the wet paper on suitable rolls. The paper containing sodium stearate is waxed according to any of the known methods. The product will be a waxed paper superior in unifromity of appearance to the same paper similarly treated, but without the sodium stearate. In addition, the soaped paper is impregnated in about two-thirds the time normally required.

The papers hereinbefore described are capable of many diverse uses. Obviously, they are suitable for use as wrapping tissues, and the papers which are both transparent and moistureproof are admirably suited for use as a wrapping tissue when it is desired to maintain the contents of the package in its original fresh condition and at the same time exhibit it to view.

For the purposes of this specification and claims, we define moistureproof materials as those which, in the form of continuous, unbroken sheets or films, permit the passage of not more than 690 grams of water vapor per 100 square meters per hour, over a period of 24 hours, at opproximately 39.5° C.±0.5° C., the relative humidity of the atmosphere at one side of the film being maintained at least at 98% and the relative humidity of the atmosphere at the other side being maintained at such a value as to give a humidity differential of at least 95%.

Moistureproofing coating compositions are defined as those which, when laid down in the form of a thin, continuous, unbroken film applied uniformly as a coating with a total coating thickness not exceeding 0.0005" to both sides of a sheet of regenerated cellulose of thickness approximately 0.0009", will produce a coated product which is moistureproof.

For the purposes of experimental tests, especially for those materials adaptable as coating compositions, moistureproof materials include those substances, compounds or compositions which, when laid down in the form of a continuous, unbroken film applied uniformly as a coating with a total coating thickness not exceeding 0.0005" to both sides of a sheet of regenerated cellulose of thickness approximately 0.0009", will produce a coated sheet which will permit the passage therethrough of not more than 690 grams of water vapor per 100 square meters per hour over a period of approximately 24 hours, at a temperature of 39.5° C.±0.5° C. (preferably 39.5° C.±0.25° C.), with a water vapor pressure differential of 50–55 mm. (preferably 53.4±0.7 mm.) of mercury. For convenience, the number of grams of water vapor passed under these conditions may be referred to as "the permeability value". An uncoated sheet of regenerated cellulose having a thickness of approximately 0.0009" will show a permeability value of the order of 6900.

Though the invention is described particularly in connection with transparentizing paper, with or without moistureproofing the same, the principles thereof are equally applicable for treating paper, cloth, or other cellulose materials to be impregnated with any suitable composition.

Since it is obvious that various changes and modifications may be made in the above description without departing from the nature or spirit thereof, this invention is not restricted thereto except as set forth in the appended claims.

We claim:

1. A process for transparentizing paper which comprises impregnating the paper with a liquid composition consisting essentially of a water-soluble soap and a liquid vehicle to provide a soap content of from 0.1% to 10.0% by weight of the cellulose material in the final product, removing the liquid vehicle whereby the said soap is distributed throughout the said paper to render the latter more absorptive for transparentizing impregnants, and impregnating the paper with a transparentizing composition.

2. A process for transparentizing paper which comprises impregnating the paper with a liquid composition consisting essentially of a water-soluble soap and a liquid vehicle to provide a soap content of from 0.1% to 10.0% by weight of the cellulose material in the final product, said liquid vehicle being a swelling agent for the cellulose fibers of the paper, removing the liquid vehicle whereby the said soap is distributed throughout the said paper to render the latter more absorptive for transparentizing impregnants, and impregnating the paper with a transparentizing composition.

3. A process for transparentizing paper which comprises impregnating the paper with a liquid composition consisting essentially of a water-soluble soap and water to provide a soap content of from 0.1% to 10.0% by weight of the cellulose material in the final product, removing the liquid vehicle whereby the said soap is distributed throughout the said paper to render the latter more absorptive for transparentizing the impregnants, and impregnating the paper with a transparentizing composition.

4. A process for transparentizing paper which comprises impregnating the paper with a composition consisting essentially of a water-soluble soap and water to provide a soap content of from 0.1% to 10.0% by weight of the cellulose material in the final product, reducing the moisture content of the impregnated material, thereafter calendering the said material until the moisture content thereof is reduced to the air-dry condition whereby the said soap is distributed throughout said paper to render the latter more absorptive for transparentizing impregnants, and impregnating the paper with a transparentizing composition.

5. A process for transparentizing paper which comprises impregnating the paper with a composition consisting essentially of a water-soluble soap and water, reducing the moisture content of the impregnated material until it constitutes 10% to 20% by weight of the paper, and thereafter calendering the said material until the moisture content thereof is reduced to the air-dry condition whereby the said soap is distributed throughout said paper to render the latter more absorptive for transparentizing impregnants, and impregnating the paper with a transparentizing composition.

6. Calendered paper having its voids filled with a transparentizing composition, said paper containing a water-soluble soap distributed throughout its mass in an amount to increase the absorptive capacity of said paper for said transparentizing composition.

7. Calendered paper having its voids filled with a transparentizing composition, said paper containing triethanolamine oleate distributed throughout its mass in an amount to increase the absorptive capacity of said paper for said transparentizing composition.

8. Calendered paper having its voids filled with a transparentizing composition, said paper containing ammonium oleate distributed throughout its mass in an amount to increase the absorptive capacity of said paper for said transparentizing composition.

9. Calendered paper having its voids filled with a transparentizing composition, said paper containing sodium stearate distributed throughout its mass in an amount to increase the absorptive capacity of said paper for said transparentizing composition.

THERON G. FINZEL.
DONALD E. DREW.